Aug. 16, 1927.
O. M. JORSTAD
1,638,856
PANTOGRAPH TROLLEY SHOE
Filed Dec. 20, 1923
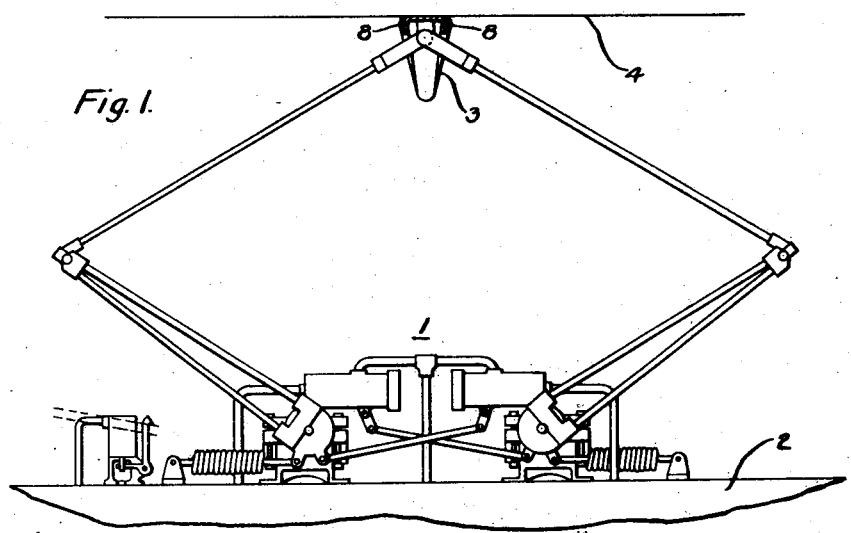
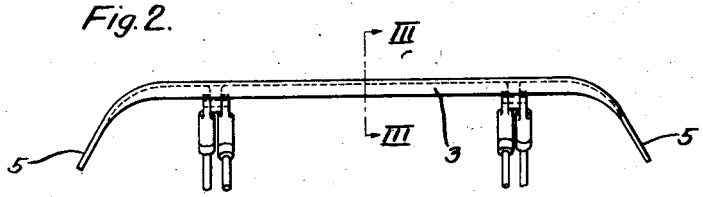
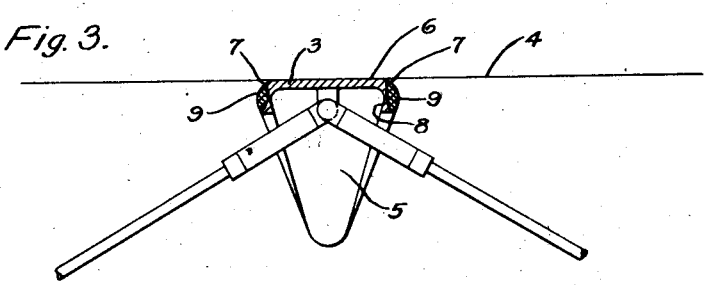
WITNESSES:
INVENTOR
Osmund M. Jorstad.
BY
ATTORNEY Patented Aug. 16, 1927.

1,638,856

UNITED STATES PATENT OFFICE.

OSMUND M. JORSTAD, OF EAST PITTSBURGH, PENNSYLVANIA, ASSIGNOR TO WESTINGHOUSE ELECTRIC & MANUFACTURING COMPANY, A CORPORATION OF PENNSYLVANIA.

PANTOGRAPH TROLLEY SHOE.

Application filed December 20, 1923. Serial No. 681,755.

My invention relates to current collectors, more especially to current collector shoes for pantograph trolley structures and it is among the objects thereof to provide contact or collector shoes having an arcing surface for the purpose of providing an uninterrupted current supply, which shall be of simple, inexpensive and durable construction.

It is a further object of my invention to provide a current collector member which shall have a surface of arcing material to facilitate arcing in one location when the collector is in engagement with a current-carrying body.

It is a further object of my invention to provide a collector member which shall be adapted to provide an uninterrupted current supply in an efficient manner, irrespective of the amount of surface contact and pressure between the supply and collector members.

Contact shoes on pantograph trolley structures generally comprise an elongated member running transversely of the trolley wire or supply line and having an adjustable pantograph support on the roof of a vehicle, the shoe being of certain relative proportions to efficiently collect current with minimum wear and with the least amount of frictional and contact interference with the trolley wire.

My present invention is directed to a pantograph shoe of substantially standard form which may be utilized in a well-known manner on standard pantograph structures and which has its trailing end-portion constructed of a material of such characteristics as will facilitate arcing to the line wire. Any suitable material may be employed having the characteristics of permitting arcing without excessive pitting and erosion when subjected to heat and atmospheric conditions, and for this purpose I have found that carbonaceous materials are best suited.

The object of such arcing surface on the trailing portion of the shoe member is to provide an uninterrupted supply of current to the collector member irrespective of variations in the contact, engagement, and pressure of the co-operating members, by reason of irregularities in the trolley line and rails or the lack of sensitiveness of the operating mechanism of the pantograph structure. My invention contemplates the maintenance of such an arc between the collector shoe and the line at all times so that either the arc or a conducting vapor emitted thereby establishes and maintains the circuit.

In the accompanying drawing constituting a part hereof and in which like reference characters designate like parts:

Fig. 1 is a side elevational view of a pantograph trolley structure mounted on the roof of a vehicle body and illustrates in cross-section a collector shoe embodying the principle of my invention;

Fig. 2 is an end elevational view of a fragmentary portion of the structure shown in Fig. 1; and Fig. 3 is an enlarged cross-sectional view of a proposed type of pantograph shoe embodying the principles of my invention.

Referring to Fig. 1, the structure herein illustrated comprises a modern pantograph structure 1, which is suitably mounted on the roof of a vehicle 2 and has mounted thereon a collector shoe 3 that is adapted to engage a trolley wire or line 4. The end-portions 5 of the shoe 3 diverge downwardly to prevent interference with the overhead line structure, as is customary.

Referring to Fig. 3, the shoe 3 is provided with a substantially flat metallic contact surface 6 having rounded edges 7 to prevent cutting or marring of the line 4 and to facilitate smooth and even contact between the line and the collector surface. These are common attributes of pantograph shoes, but I propose to provide the edge-portions of tips 8 of the shoe with an arcing substance 9 of relatively high electrical resistance such as carbon, which may be secured thereto in any suitable manner for the purpose of maintaining an arc between the shoe and the trolley wire at the one or the other trailing end or edge-portion 8, according to the direction of travel of the vehicle. Any suitable material may be employed instead of the carbon insert or bead 9 to facilitate arcing, as it is the purpose of my invention to provide any suitable means for establishing a constant arc between the collector and the line wire. It is obvious that by means of such a connecting arc or the conducting gases generated thereby, an uninterrupted supply of current will be provided for the shoe irrespective of the amount of contact at the surface 6 of the shoe by reason of variations or irregularities in the line and rails.

It is evident from the above description of my invention that the principle described therein may be advantageously utilized in an efficient contact device for current collectors and especially in the pantograph type of current-collecting devices.

Although I have described and illustrated my invention as embodied in a pantograph trolley shoe, it is obvious that the principle thereof may be utilized in other structures where it is desirable to utilize an arc as an auxiliary conducting means or as a primary conductor.

I claim as my invention:—

1. A current collector of the pantograph type comprising a conductor member having its trailing tip of relatively high resistance.

2. A current collector of the pantograph type comprising a conductor member having its trailing tip of carbon material.

3. A current collector comprising a conductor member having a relatively large contact surface and a lesser arcing surface of carbon material, the latter deviating from the plane of contact of the former.

4. A current collector comprising a conductor member having a relatively large contact surface and a plurality of lesser arcing surfaces, the latter deviating from the plane of contact of the former and being adapted to facilitate arcing.

5. A current collector comprising a conductor member having a body of metallic material and edge portions of relatively higher electrical resistance.

In testimony whereof, I have hereunto subscribed my name this 26th day of November, 1923.

OSMUND M. JORSTAD.